(12) United States Patent
Suda

(10) Patent No.: US 7,432,970 B2
(45) Date of Patent: Oct. 7, 2008

(54) CCD BREAKAGE PREVENTION SYSTEM

(75) Inventor: Tadaaki Suda, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/346,250

(22) Filed: Feb. 3, 2006

(65) Prior Publication Data

US 2006/0176384 A1    Aug. 10, 2006

(30) Foreign Application Priority Data

Feb. 4, 2005    (JP)    ............................. 2005-028791

(51) Int. Cl.
*H04N 3/14*    (2006.01)
*H04N 5/335*    (2006.01)
(52) U.S. Cl. .................................... 348/311; 348/222.1
(58) Field of Classification Search ................... 348/65, 348/73, 311, 312, 71, 72, 75, 118, 294, 302, 348/372; 385/118, 17
See application file for complete search history.

(56) References Cited

U.S. PATENT DOCUMENTS

| | | | | |
|---|---|---|---|---|
| 5,412,478 A | * | 5/1995 | Ishihara et al. ................. | 348/72 |
| 5,630,179 A | * | 5/1997 | Kishida ........................ | 396/18 |
| 6,246,432 B1 | * | 6/2001 | Takami et al. ................. | 348/65 |
| 6,324,420 B1 | * | 11/2001 | Kishida et al. .............. | 600/479 |
| 2001/0010553 A1 | * | 8/2001 | Tanaka et al. ................ | 348/311 |
| 2002/0024785 A1 | * | 2/2002 | Yano ........................... | 361/92 |
| 2004/0080612 A1 | * | 4/2004 | Sugimoto .................... | 348/65 |

OTHER PUBLICATIONS

U.S. Appl. No. 11/346,252 to Suda, filed Feb. 3, 2006.
U.S. Appl. No. 11/345,351 to Suda, filed Feb. 3, 2006.

* cited by examiner

*Primary Examiner*—NgocYen T. Vu
*Assistant Examiner*—Kent Wang
(74) *Attorney, Agent, or Firm*—Greenblum & Bernstein, P.L.C.

(57) ABSTRACT

A CCD control system includes a driving section supplying a drive signal and a power voltage to a CCD, a bias voltage generation section, a monitor signal output section that outputs monitor signals corresponding to the power voltage which is applied to the CCD. The CCD control system further includes a signal switching section that selects a first state where the monitor signals are input/output through the signal switching based on the substrate bias voltage or a second state where the predetermined signal is output. A monitor signal monitoring section is provided to monitor the output from the signal switching section. The monitor signal monitoring section sends a directive signal to the driving section to stop supplying the drive signal when the signal switching section outputs the predetermined signal or when the monitor signal output from the signal switching section in the first state is abnormal.

17 Claims, 3 Drawing Sheets

CCD BREAKAGE PREVENTION SYSTEM

BACKGROUND OF THE INVENTION

The present invention relates to a CCD control system for prevention of CCD breakage, and an endoscope which includes the CCD control system.

CCD (Charge Coupled Device) is a device that can transform an optical image of a subject formed on a receiving surface into electric signals with an opt-electric conversion. Usually, the electric signals are processed by a signal processing section incorporated in the CCD control unit outside the device, and are output as image signals. It is necessary to supply various kinds of power voltages and clock pulses to drive the CCD. One of the power voltages is a substrate bias voltage (hereinafter referred to as Vsub). Vsub is generated by a Vsub generation circuit. CCDs fall into two classes: an internal Vsub generation type that CCD includes a Vsub generation circuit, and an external Vsub generation type that CCD is supplied Vsub by a Vsub generation circuit incorporated in the CCD control unit outside the CCD.

An electronic endoscope is configured with an insertion tube which is inserted into a human cavity, an operation unit, a scope unit which includes cables and connectors for connection with a processor unit, and the processor unit which has an electric power supply and a light source supplied to the scope unit, and functions such as processing image signals from the scope unit to output to a monitor. Intensive research and development have been made to make the insertion tube as thinner as possible to reduce pain and suffering of patients and to enable observation inside of canals of a human body. Therefore, it is desirable that the smaller CCD is placed at the distal end of the insertion tube of the scope unit.

Because an external Vsub generation type CCD does not require a space for placing a Vsub generation circuit inside the device, it is possible to make the device smaller than an internal Vsub generation type CCD. On the other hand, the external Vsub generation type CCD requires a Vsub supply line from the CCD control unit which has the Vsub generation circuit extended to the CCD. Usually the CCD control unit is located in the scope, but near the processor unit, namely, near the connectors. So, the Vsub supply line is extended to the CCD installed at the distal end of the insertion tube through the scope as well as the other signal lines.

Therefore, in the case of an electronic endoscope with the external Vsub generation type CCD, it is highly possible that Vsub is not input to the CCD or the voltage level lowers, and the other signal, such as a clock pulse, is input, compared with in the case of an electronic endoscope with the internal Vsub generation type CCD. As a result, breakage of the external Vsub generation type CCD more likely caused by a latchup, etc. than the internal Vsub generation type CCD. Possible reasons why Vsub is not input may be a Vsub output error of the Vsub generation circuit such as output power loss of the circuit, a Vsub supply error from the Vsub generation circuit to the CCD such as short-circuit, wire breakage, bad electrical contact in a Vsup supply line. In the case of the electronic endoscope with the external Vsub generation type CCD, it is desirable that the other signal inputs than Vsub are stopped instantaneously when a Vsub output error is detected so as to prevent a latchup, etc.

Usually, power voltage around 15 V is supplied to the the CCD. It is also possible that the CCD breakage occurs when an error happens and the power voltage is not supplied. Namely, when minus power, for example minus power of a vertical clock pulse, is supplied while power voltage is not supplied to the CCD, a latchup is caused.

On the other hand, in order to detect a Vsub supply error and a power voltage supply error, it is possibly required to place two devices to monitor the Vsub and power voltage respectively near the CCD, to lay signal lines to transmit monitor signals to the CCD control circuit, and further to place circuits to receive the monitor signals in the CCD control circuit. But in that case, the number of devices near the CCD and the number of signal lines increase. As a result, the diameter of the insertion tube of the scope unit becomes larger, and the CCD control circuit becomes complex because receiving circuits of the monitor signals are also required.

SUMMARY OF THE INVENTION

The present invention is advantageous in that a CCD control system is provided that prevents CCD breakage caused by a latchup, etc. by detecting a Vsub output error, a Vsub supply error or a power voltage supply error with simple configuration of smaller number of devices. The invention is also advantageous in that an electronic endoscope with the CCD control system is provided that enables prevention of CCD breakage caused by a latchup, etc.

According to an aspect of the invention, there is provided a CCD control system, including a driving section that supplies a drive signal and a power voltage to a CCD to drive the CCD, a bias voltage generation section that generates substrate bias voltage, a monitor signal output section that outputs monitor signals corresponding to the power voltage based on the power voltage which is applied to the CCD, a signal switching section that selects one of a first state (normal state) where the monitor signals are input and output through the signal switching section based on the substrate bias voltage and a second state (abnormal state) where a predetermined signal is output, and a monitor signal monitoring section that monitors the output from the signal switching section, the monitor signal monitoring section sending a directive signal to the driving section to stop supplying the drive signal one of when the signal switching section outputs the predetermined signal and when the monitor signal output from the signal switching section in the first state is abnormal.

As described above, the CCD control system in accordance with the present invention enables prevention of CCD breakage caused by a latchup, etc. by detecting a Vsub output error, a Vsub supply error and a power voltage supply error with simple configuration of smaller number of devices. The invention is also advantageous in that an electronic endoscope with the CCD control system is provided that enables prevention of CCD breakage caused by a latchup, etc.

Optionally, the monitor signal output from the monitor signal output section may be substantially equal to the power voltage. Further optionally, the monitor signal output from the monitor signal output section may be a converted signal at the predetermined level of the power voltage.

Optionally, the signal switching section may be in the first state (normal state) when the substrate bias voltage is equal to or greater than a predetermined value, and the section being in the second state (abnormal state) when the voltage is less than the predetermined value.

Optionally, the signal switching section may include a three-terminal switch including a signal input terminal to which the monitor signal is input, a signal output terminal which is connected to the monitor signal monitoring section and a GND terminal which is connected to the ground, the signal switching section operating such that the signal input terminal is connected to the signal output terminal in the first state, while the signal output terminal is connected to the GND terminal in the second state.

Optionally, the monitor signal monitoring section may send a directive signal to the driving section to stop supplying the drive signal when the output signal from the signal switching section lowers less than the predetermined value. Further optionally, the monitor signal monitoring section may send a directive signal to the driving section to stop supplying the drive signal when the output signal from the signal switching section is at the GND level.

Further optionally, the monitor signal monitoring section may output different error detection signals respectively corresponding a case where the output signal from the signal switching section is at the GND level and a case where the signal is lowered to less than the predetermined value as well as the directive signal to the driving section to stop supplying the drive signal.

According to another aspect of the invention, there is provided an electronic endoscope system including: a scope having a driving section that supplies a drive signal and power voltage to a CCD at the distal end of the scope to drive the CCD, and a bias voltage generation section that generates substrate bias voltage; a processor; a monitor signal output section that outputs monitor signals corresponding to the power voltage based on the power voltage input into the CCD; a signal switching section arranged near the CCD, the the signal switching section selecting one of a first state (normal state) where the monitor signals are input and output through the signal switching section and a second state (abnormal state) where predetermined signals are output, based on the substrate bias voltage; and a monitor signal monitoring section that monitors the output from the signal switching section and sends a directive signal to the driving section to stop supplying the drive signal one of when the signal switching section outputs the predetermined signals and when the monitor signal output from the signal switching section in the first state is abnormal.

With the configuration of the electronic endoscope in accordance with the present invention, placing the signal switch section at the distal end of the scope, which requires only one more signal line, allows error detection of both a Vsub error and a power voltage error and instantaneous stoppage of the drive signal to the CCD so as to prevent a latchup, etc.

Optionally, the monitor signal from the monitor signal output section may be substantially equal to the power voltage. Further optionally, the monitor signal output from the monitor signal output section may be a converted signal at the predetermined level of the power voltage.

Optionally, the signal switching section may be in the first state (normal state) when the substrate bias voltage is equal to or greater than a predetermined value, the signal switching section being in the second state (abnormal state) when the substrate bias voltage is less than the predetermined value.

Optionally, the signal switching section may include a three-terminal switch including a signal input terminal to which the monitor signal is input, a signal output terminal which is connected to the monitor signal monitoring section and a GND terminal which is connected to the ground. The signal switching section may operate such that the signal input terminal is connected to the signal output terminal in the first state, the signal output terminal being connected to the GND terminal in the second state.

Optionally, the monitor signal monitoring section may send the directive signal to the driving section to stop supplying the drive signal when the output signal from the signal switching section is lowered to a voltage which is equal to or less than a predetermined value. Further optionally, the monitor signal monitoring section may send the directive signal to the driving section to stop supplying the drive signal when the output signal from the signal switching section is at the GND level.

Further optionally, the monitor signal monitoring section may output different error detection signals respectively corresponding to a case where the output signal from the signal switching section is at the GND level, and a case where the signal is lowered to a voltage less than the predetermined value, the monitor signal monitoring section also sending the directive signal to the driving section to stop supplying the drive signal.

Optionally, the driving section, the bias volatage generation section and the monitor signal monitoring section may be arranged near a proximal end where the scope is connected to the processor.

As described above, the invention can provide a CCD control system which prevents CCD breakage caused by a latchup, etc. with simpler configuration than the conventional one. This is because signal input to the CCD is instantaneously stopped when a Vsub input error or a power voltage error is detected. Further the invention can also provide an electronic endoscope with the CCD control system that can prevent CCD breakage caused by a latchup, etc. with thinner insertion tube. The endoscope requires adding only one more device near the CCD and one more signal line. On the other hand, in the case of monitoring method where a Vsub error and a power voltage error are separately detected, the more complicated configuration is necessary, and as a result, the diameter of the insertion tube becomes larger.

BRIEF DESCRIPTION OF THE ACCOMPANYING DRAWINGS

DETAILED DESCRIPTION OF THE EMBODIMENTS

Hereinafter, a CCD control system and an electronic endoscope according to an embodiment of the present invention will be described with reference to the accompanying drawings.

Figure 1:
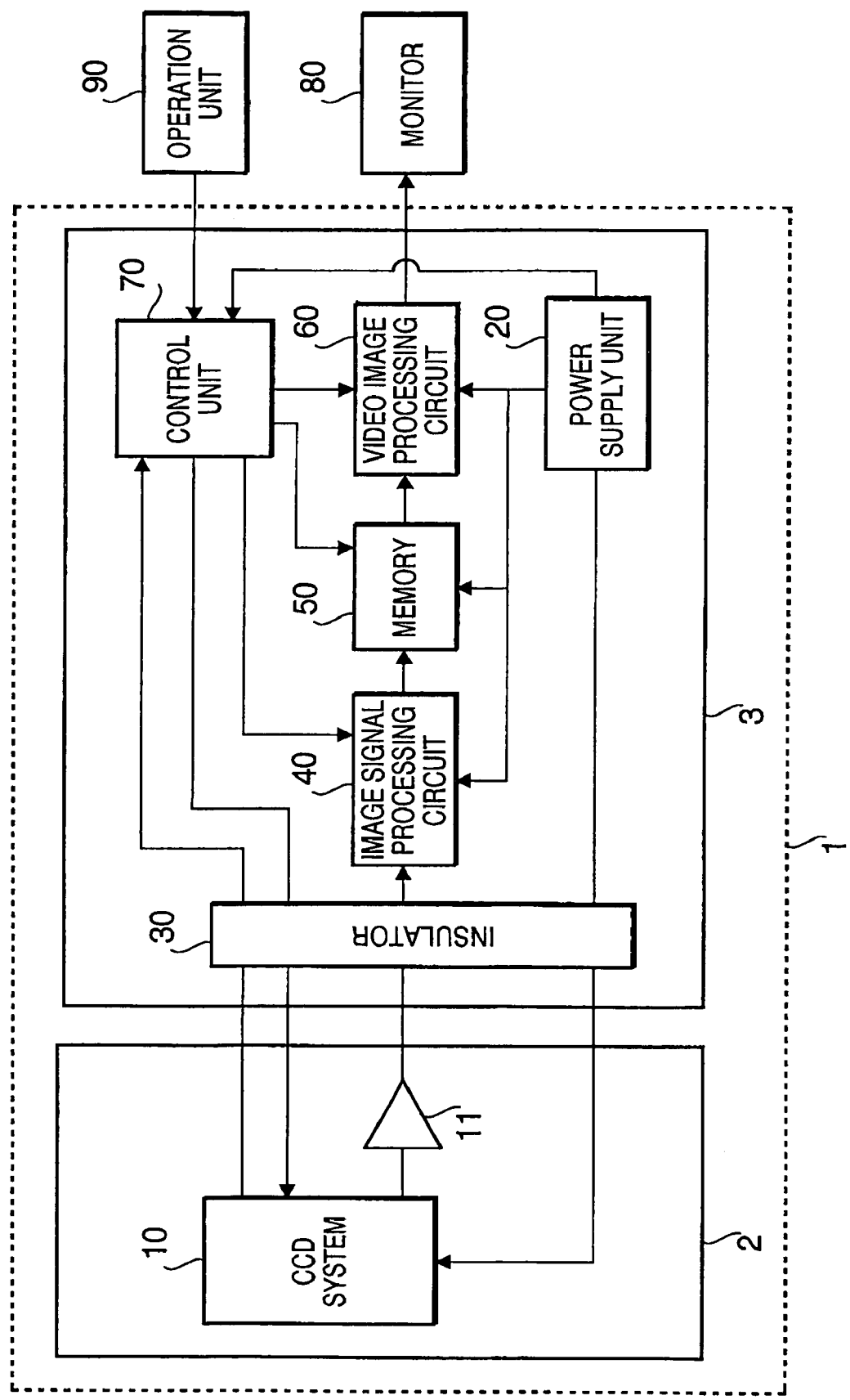
FIG. 1 is a function block diagram to show the configuration of the electronic endoscope system in an embodiment of the invention.

FIG. 1 is a function block diagram of an electronic endoscope 1 with the control system according to an embodiment of the present invention. The electronic endoscope 1 includes a scope unit 2 and a processor unit 3. The scope unit 2 and the processor unit 3 are connected by a connector (not shown). An operation unit 90 (like a keyboard) and a monitor 80 are connected to the processor unit 3.

The scope unit 2 includes an insertion tube, an operation unit, a forceps insertion port, cables, connectors, etc. (not shown). The scope unit 2 includes therein a CCD system 10 having a CCD section 100, a CCD control circuit 200 (see FIG. 2), a signal driving circuit 11 which transmits image signals from the CCD system 10, and various other sections such as a light guide, a forceps channel, an operation cable, an air line, a water line (not shown). With handling the scope unit 2, an operator observes and operates inside a human cavity of a patient.

The processor unit 3 includes a power supply unit 20, an insulator 30, an image signal processing circuit 40, a memory section 50, a video image processing circuit 60, a control unit 70. The processor 3 also includes a light source unit having a lamp, an aperture and a RGB color filter (not shown). The power supply unit 20 supplies electronic power to the image signal processing unit 40, the memory section 50, the video image processing circuit 60, the control unit 70, the CCD system 10 and the signal driving circuit 11.

The insulator 30 have a function to provide electrical insulation between the scope unit 2 and the processor unit 3. The insulator 30 can be configured using any device which can transmit signals and voltages in an isolated state such as an isolation transformer, a photo coupler which includes a LED and a photo diode, or an equivalent IC module. Consequently, circuits in the scope unit 2 are electrically isolated from circuits in the processor unit 3. Therefore, the configuration can prevent an electric shock by an electric leakage to a patient.

Analog image signals output from the CCD system 10 are transmitted to the image signal processing circuit 40 through the signal driving circuit 11 and the insulator 30. The image signal processing circuit 40 applies AD (analog-to-digital) conversion to the input image signals. The converted digital image signals are stored as R-signals, G-signals, B-signals, respectively, in predetermined areas of the memory section 50 at timing of synchronization signals supplied by the control unit 70. The memory section 50 is controlled by write memory synchronization signals, and then output R-signals, G-signals and B-signals.

Digital image signals which are output from the memory section 50 and synchronized, namely R-signals, G-signals and B-signals, are input to the video image processing circuit 60. The video processing circuit 60 performs D/A conversion, amplification, etc., of the signals, and outputs the signals to the monitor 80 as analog signals. With the monitor 80, an operator can observe and operate an affected area while viewing an image inside a human cavity. The operator can also see a still image with the monitor 80.

The control unit 70 controls the CCD system 10, the image signal processing circuit 40, the memory section 50 and the video image processing circuit 60. The control unit 70 receives signals from the operation unit 90 according to the operator's action and receives error detection signals from the CCD system 10 which are described later. For example, when an error detection signal is received, it is possible that the video image processing circuit makes the monitor 80 to display the predetermined image or characters, etc., and it is also possible that the control unit 70 makes a buzzer or a speaker, etc. (not shown) to generate the predetermined sound. Due to the configuration, the operator can notice whether a CCD input error is caused by the output of the Vsub generation circuit or by failure of Vsub supply.

The signal processing mechanism in the embodiment of the present invention described above is mainly to be applied to frame sequential endoscopes. However, the CCD control system and the electronic endoscope according to the invention can be applied to simultaneous endoscopes or other type of endoscopes.

Next, a CCD control system according to the embodiment of the invention will be described.

Figure 2:
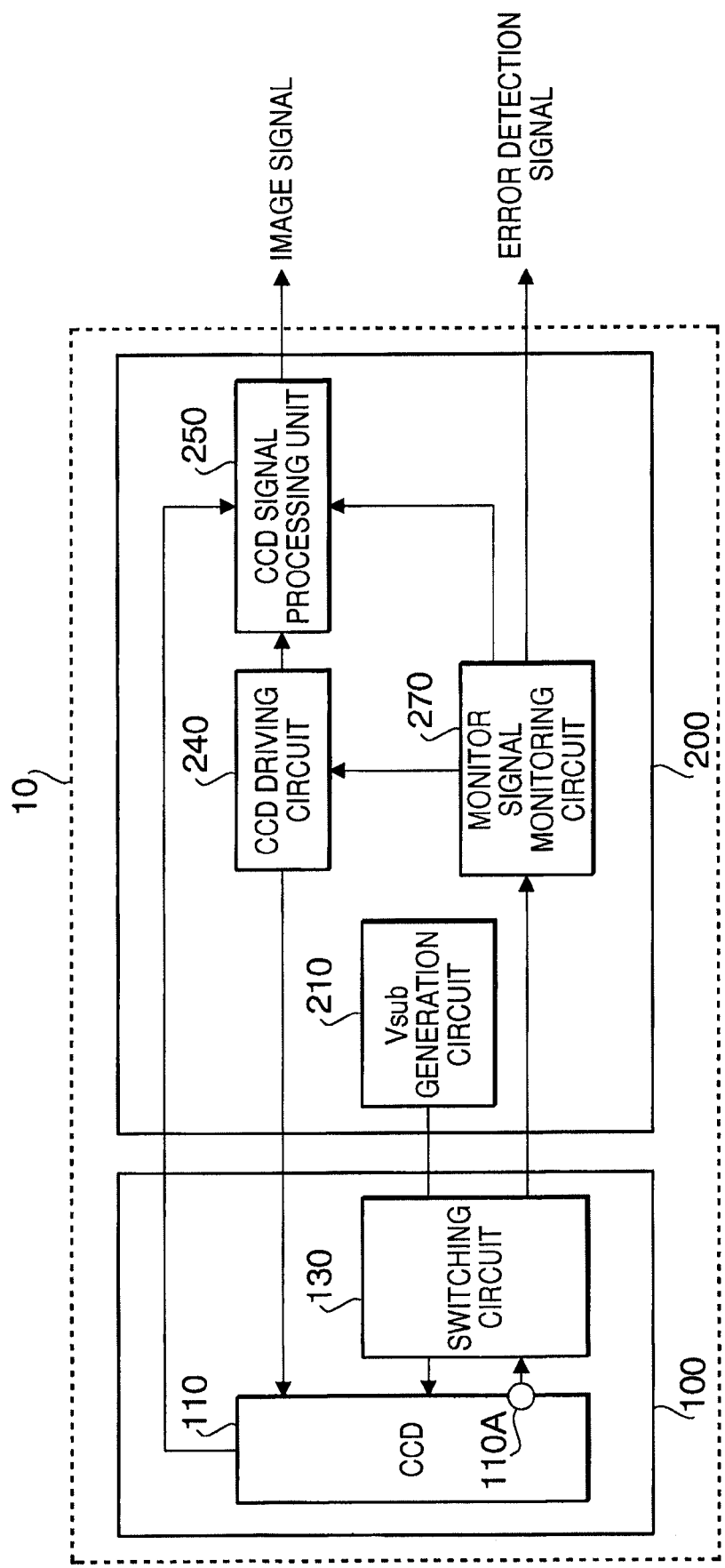
FIG. 2 is a function block diagram of the CCD system in the FIG. 1.

FIG. 2 is a function block diagram to show the details of the CCD system 10 shown in the FIG. 1. The CCD system 10 consists of the CCD section 100 and the CCD control circuit 200. The CCD section 100 is located at the distal end of the insertion tube of the scope unit 2, and includes a CCD 110 and a switching circuit 130. The CCD control circuit 200 is located near the connector of the scope unit 2, and includes the Vsub generation circuit 210, the CCD driving circuit 240, the CCD signal processing unit 250, and the monitor signal monitoring circuit 270. FIG. 2 does not show an electric power source or power supply lines, but each function block included in the CCD control circuit 200 is supplied power by the processor unit 3.

The CCD 110 is a charge coupled device which is one of photoelectric conversion devices. The CCD 110 converts an optical image of intensities of light on the receiving surface of the CCD 110 to signal charges according to the intensities. The output stage of the horizontal CCD is for converting the signal charges into signal voltage changes. The CCD 110 is a sensor device that has such an opt-electric conversion function and each element of the CCD is highly micronized. So, nanofabrication technology of semiconductor processes is applied to the fabrication process of the CCD. Therefore, inside the device, parasitic transistors are inevitably generated. As a result, when a input signal voltage other than Vsub is above Vsub, or when minus voltage is supplied while power voltage lowering, a latchup, etc. occurs and the heat generation leads to breakage of the device.

The CCD 110 receives Vsub generated by the Vsub generation circuit 210 and CCD input signals, such as power voltage and multiple clock pulses supplied by the CCD driving circuit 240, and transmits the accumulated signal charges with photoelectric conversion, thus, outputs electronic signals. Therefore, in the external Vsub generation type CCD 110, the input terminal for Vsub and the input terminal for clock pulses independently exist, and so in the configuration, only CCD signals other than Vsub could possibly be input while Vsub is not input to the CCD 110.

The Vsub generation circuit 210 generates predefined Vsub with the power voltage supplied by the power supply unit 20 of the processors unit 3. Vsub is supplied through the switching circuit 130 to the CCD 110. Because Vsub is the reference value of various electric potential distributions inside the CCD, the CCD does not work without the Vsub input. According to the embodiment of the present invention, as a way of detecting Vsub lowering, a switching circuit 130 is provided that has a function to switch according to the value of Vsub. When the switching circuit 130 is placed on the Vsub supply line, it is desirable to place the circuit as close as possible to the Vsub input terminal of the CCD 110 so as to make the distance to monitor longer and prevent Vsub supply error generation between the circuit and the CCD 110. In the embodiment of the present invention, the switching circuit 130 is placed in the CCD section 100 at the distal end of the scope.

The CCD drive circuit 240 supplies power voltage, for example 15 V, and the other multiple clock pulses, etc. to the CCD 110. The circuit supplies synchronizing signals related to the clock pulses to the CCD signal processing unit 250. Further, according to the embodiment of the present invention, the CCD drive can stop clock pulse supply by receiving a signal from the monitor signal monitoring unit 270 when a Vsub error or a power voltage error occurs. The configuration allows preventing a latchup. In the embodiment of the present invention, in order to monitor the power voltage, a monitor signal is output from the monitor signal output terminal 110A of the CCD 110, through the switching circuit 130, to the monitor signal monitoring circuit 270. Optionally, the monitor signal may be equal to the power voltage. Further optionally, the monitor signal may be a signal converted to a predetermined level based on the power voltage.

The CCD signal processing unit 250 receives electronic signals output from the CCD 110, and performs given processes to convert electronic signals to image signals based synchronization signals supplied by the CCD driving circuit

240. The processed image signals are output to the signal drive circuit 11 shown in the FIG. 1 as analog signals.

Figure 3:
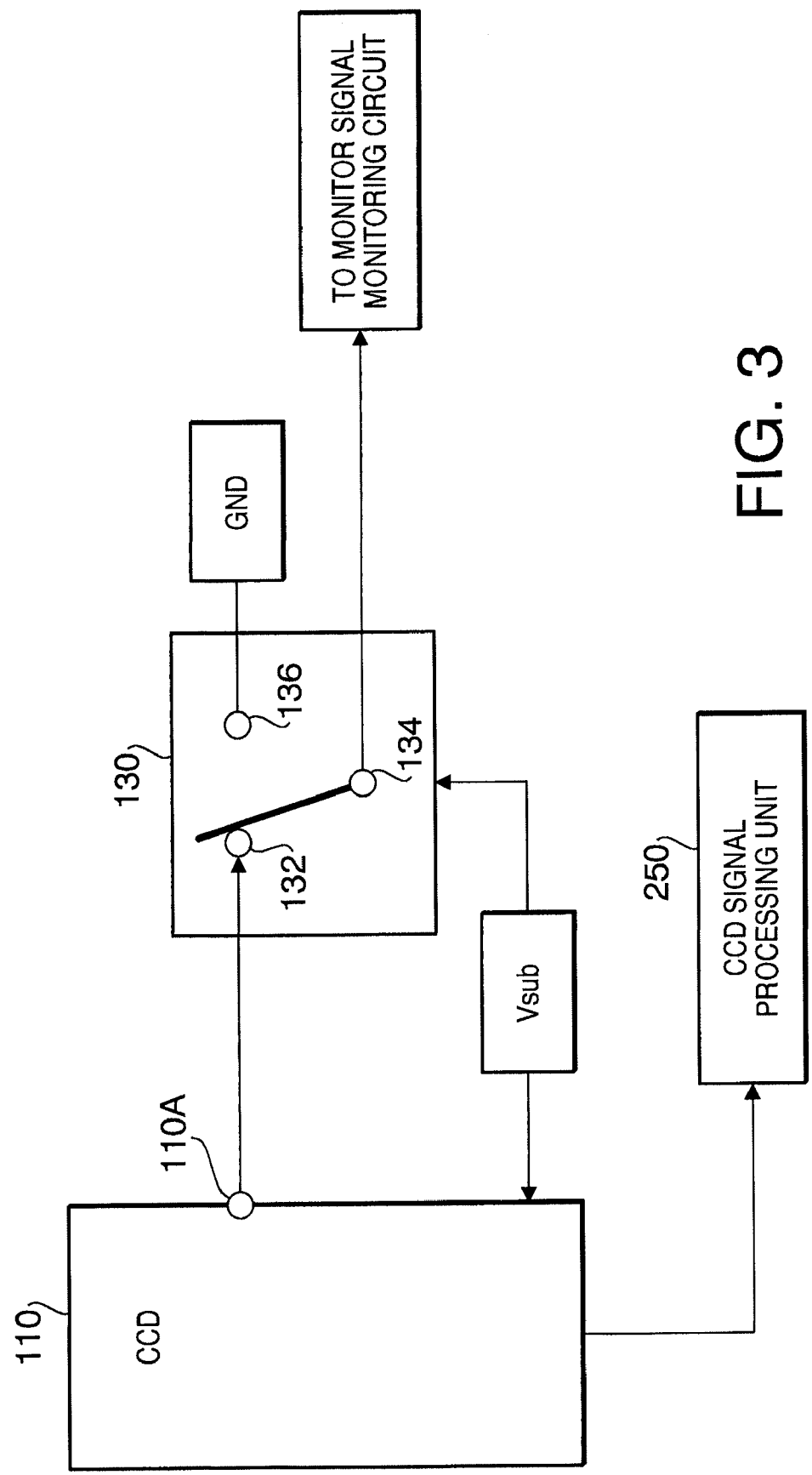
FIG. 3 is a diagram to show the switching circuit of the embodiment of the invention.

FIG. 3 is a conceptual diagram of the switching circuit 130. The switching circuit 130 may be configured as an IC such as a relatively small IC which includes an analog switching circuit and a comparator, etc. It is desirable for the switching circuit 130 to be smaller as possible, because the circuit is placed in the CCD section 100 at the distal end of the insertion tube of the scope unit 2. The switching circuit 130 includes at least the following three terminals: a terminal 132 connected to the monitor signal output terminal of the CCD 110, a terminal 134 connected to the monitor signal monitoring circuit 270 and a terminal 136 connected to the ground GND, and a Vsub input terminal. The switching circuit has the following function. When Vsub is not input, the switching circuit conducts the terminal 134 to the terminal 136. The terminal 134 is connected to GND. When Vsub is equal or greater than the predetermined value, the circuit conducts the terminal 132 to the terminal 134 (normal state). When Vsub is less than the predetermined value, the circuit conducts the terminal 134 to the terminal 136 (abnormal state). Therefore, when normal Vsub that is equal or greater than the predetermined value is input, the monitor signal of the power voltage from the CCD 110 is transmitted to the monitor signal monitoring circuit 270. But when Vsub is not input because of a Vsub supply error or a Vsub output error, or Vsub is less than the predetermined value, the signal voltage detected by the monitor signal monitoring circuit 270 is at GND level, because the terminal 134 is conducted to the terminal 136.

The monitor signal monitoring circuit 270 (see FIG. 2) monitors an output signal from the switching circuit 130. When the monitor signal monitoring circuit 270 detects a signal of GND level, it means the signal is the voltage indicating an error supplied with the function of the switching circuit 130 leading to the conclusion that there is an error in Vsub. Further, when the monitor signal voltage is at the different voltage level than the GND level, and equal or less than the predetermined value, for example 15V, it can be concluded that there is an error in power voltage. In both cases, the monitor signal monitoring circuit 270 instantaneously sends a control signal to the CCD drive circuit 240, and stop clock pulse supply to the CCD 110. The monitor signal monitoring circuit 270 sends an error detection signal to the processor unit 3 while sending a control signal to the CCD drive circuit 240. Optionally, there are two kinds of error detection signals: a signal indicating a Vsub error and a signal indicating a power voltage error. The error detection signal is received by the control unit 70, and displays predetermined message or image on the monitor 80 via the video image processing circuit 60, and/or makes sound so as to notify a user of error occurrence.

Consequently, the CCD control system according to the present invention can have a function to detect two kinds of errors: a Vsub error and a power voltage error, and to prevent a latchup, with only adding one circuit (the switching circuit 130) to the CCD section 10, and one circuit (the monitor signal monitoring circuit 270) to the CCD control circuit 200, and one signal line between the CCD section 100 and the CCD control circuit 200.

The endoscope according to the present invention, by adopting the CCD control system of the embodiment of the invention, can has a function to detect two kinds of errors, Vsub error and power voltage error, and to prevent a latchup, with only adding one circuit (the switching circuit 130) in the insertion tube of the scope unit 2, one signal line, and a monitoring circuit in the CCD control unit 200.

The present disclosure relates to the subject matter contained in Japanese Patent Application No. P2005-028791, filed on Feb. 4, 2005, which is expressly incorporated herein by reference in its entirely.

What is claimed is:

1. A CCD control system comprising:
   a driving section that supplies at least one drive signal and a power voltage to a CCD to drive the CCD;
   a bias voltage generation section that generates a substrate bias voltage;
   a monitor signal output section that outputs monitor signals corresponding to the power voltage based on the power voltage which is applied to the CCD;
   a signal switching section that selects one of a first state where the monitor signals are input and output through the signal switching section and a second state where a predetermined signal is output, based on the substrate bias voltage; and
   a monitor signal monitoring section that monitors the output from the signal switching section, the monitor signal monitoring section sending a directive signal to the driving section to stop supplying the drive signal one of when the signal switching section outputs the predetermined signal and when the monitor signal output from the signal switching section in the first state is abnormal.

2. The CCD control system according to claim 1, wherein the monitor signal output from the monitor signal output section is substantially equal to the power voltage.

3. The CCD control system according to claim 1, wherein the monitor signal output from the monitor signal output section is a converted signal at the predetermined level of the power voltage.

4. The CCD control system according to claim 1, wherein the signal switching section is in the first state when the substrate bias voltage is equal to or greater than a predetermined value, the signal switching section being in the second state when the substrate bias voltage is less than the predetermined value.

5. The CCD control system according to claim 1, wherein the signal switching section includes a three-terminal switch including a signal input terminal to which the monitor signal is input, a signal output terminal which is connected to the monitor signal monitoring section and a GND terminal which is connected to the ground, the signal switching section operating such that the signal input terminal is connected to the signal output terminal in the first state, while the signal output terminal is connected to the GND terminal in the second state.

6. The CCD control system according to claim 1, wherein the monitor signal monitoring section sends a directive signal to the driving section to stop supplying the drive signal when the output signal from the signal switching section lowers equal to or less than a predetermined value.

7. The CCD control system according to claim 1, wherein the monitor signal monitoring section sends the directive signal to the driving section to stop supplying the drive signal when the output signal from the signal switching section is at the GND level.

8. The CCD control system according to claim 6, wherein the monitor signal monitoring section outputs different error detection signals respectively corresponding a case where the output signal from the signal switching section is at the GND level and a case where the signal is lowered to less than the predetermined value as well as the directive signal to the driving section to stop supplying the drive signal.

9. An electronic endoscope system comprising:
a scope including a driving section that supplies at least one drive signal and power voltage to a CCD at the distal end of the scope to drive the CCD; and
a bias voltage generation section that generates substrate bias voltage;
a processor;
a monitor signal output section that outputs monitor signals corresponding to the power voltage based on the power voltage applied to the CCD;
a signal switching section arranged near the CCD, the signal switching section selecting one of a first state where the monitor signals are input and output through the signal switching section and a second state where predetermined signals are output, based on the substrate bias voltage;
a monitor signal monitoring section that monitors the output from the signal switching section and sends a directive signal to the driving section to stop supplying the drive signal one of when the signal switching section outputs the predetermined signals and when the monitor signal output from the signal switching section in the first state is abnormal.

10. The electronic endoscope system according to claim 9, wherein the monitor signal from the monitor signal output section is substantially equal to the power voltage.

11. The electronic endoscope system according to claim 9, wherein the monitor signal output from the monitor signal output section is a converted signal at the predetermined level of the power voltage.

12. The electronic endoscope according to claim 9, wherein the signal switching section is in the first state when the substrate bias voltage is equal to or greater than a predetermined value, the signal switching section being in the second state when the substrate bias voltage is less than the predetermined value.

13. The electronic endoscope according to claim 9, wherein the signal switching section includes a three-terminal switch including:
a signal input terminal to which the monitor signal is input;
a signal output terminal which is connected to the monitor signal monitoring section; and
a GND terminal which is connected to the ground,
wherein the signal switching section operates such that the signal input terminal is connected to the signal output terminal in the first state, the signal output terminal being connected to the GND terminal in the second state.

14. The electronic endoscope according to claim 9, wherein the monitor signal monitoring section sends the directive signal to the driving section to stop supplying the drive signal when the output signal from the signal switching section is lowered to a voltage which is equal to or less than a predetermined value.

15. The electronic endoscope according to claim 9, wherein the monitor signal monitoring section sends the directive signal to the driving section to stop supplying the drive signal when the output signal from the signal switching section is at the GND level.

16. The electronic endoscope according to claim 14, wherein the monitor signal monitoring section outputs different error detection signals respectively corresponding to a case where the output signal from the signal switching section is at the GND level, and a case where the signal is lowered to a voltage less than the predetermined value, the monitor signal monitoring section also sending the directive signal to the driving section to stop supplying the drive signal.

17. The electronic endoscope according to claim 9, wherein the driving section, the bias voltage generation section and the monitor signal monitoring section are arranged near a proximal end of the scope where the scope is connected to the processor.

* * * * *